United States Patent
Franklin et al.

(10) Patent No.: US 6,815,113 B2
(45) Date of Patent: Nov. 9, 2004

(54) COMPLIANT ELECTRICAL CONTACTS FOR FUEL CELL USE

(75) Inventors: Jerrold E. Franklin, Sacramento, CA (US); Eric S. Mettler, Cameron Park, CA (US)

(73) Assignee: Altergy Systems, Gold River, CA (US)

( * ) Notice: Subject to any disclaimer, the term of this patent is extended or adjusted under 35 U.S.C. 154(b) by 0 days.

(21) Appl. No.: 10/068,154

(22) Filed: Feb. 6, 2002

(65) Prior Publication Data

US 2002/0142664 A1 Oct. 3, 2002

Related U.S. Application Data

(62) Division of application No. 09/834,390, filed on Apr. 13, 2001, now abandoned.
(60) Provisional application No. 60/226,471, filed on Aug. 18, 2000.

(51) Int. Cl.[7] ................................................ H01M 8/12
(52) U.S. Cl. ........................................... 429/34; 429/12
(58) Field of Search .............................. 429/34–36, 38, 429/39, 127; 439/66

(56) References Cited

U.S. PATENT DOCUMENTS

| 4,767,519 | A |   | 8/1988  | de Nora |
|-----------|---|---|---------|---------|
| 4,855,193 | A |   | 8/1989  | McElroy |
| 5,270,131 | A | * | 12/1993 | Diethelm et al. ............. 429/34 |
| 5,299,939 | A | * | 4/1994  | Walker et al. ................ 439/74 |
| 5,484,514 | A |   | 1/1996  | Katayama |
| 5,565,072 | A |   | 10/1996 | Faita et al. |
| 5,773,161 | A | * | 6/1998  | Farooque et al. ............. 429/34 |
| 6,030,718 | A |   | 2/2000  | Fuglevand |
| 6,080,502 | A | * | 6/2000  | Nolscher et al. ............. 429/34 |
| 6,149,443 | A | * | 11/2000 | Moran ......................... 439/66 |
| 6,190,793 | B1 |  | 2/2001  | Barton et al. |
| 6,218,035 | B1 |  | 4/2001  | Fuglevand |
| 6,224,396 | B1 | * | 5/2001  | Chan et al. ................... 439/71 |
| 6,299,999 | B1 | * | 10/2001 | Buchner et al. .............. 429/34 |
| 6,468,682 | B1 | * | 10/2002 | Fuglevand et al. .......... 429/26 |

FOREIGN PATENT DOCUMENTS

WO      WO 97/27638 A  *  7/1997   ............ H01M/8/24

* cited by examiner

Primary Examiner—Gregg Cantelmo
(74) Attorney, Agent, or Firm—Daniel P. Maguire

(57) ABSTRACT

This invention provides arrays of independently acting compliant electrical contacts within a fuel cell. These contacts maintain electrical contact between a plate and the adjacent membrane electrode assembly, and provide substantially uniform internal pressure distribution and substantially uniform electrical contact. In one embodiment, the electrical contacts are springs, which can take a variety of forms.

18 Claims, 17 Drawing Sheets

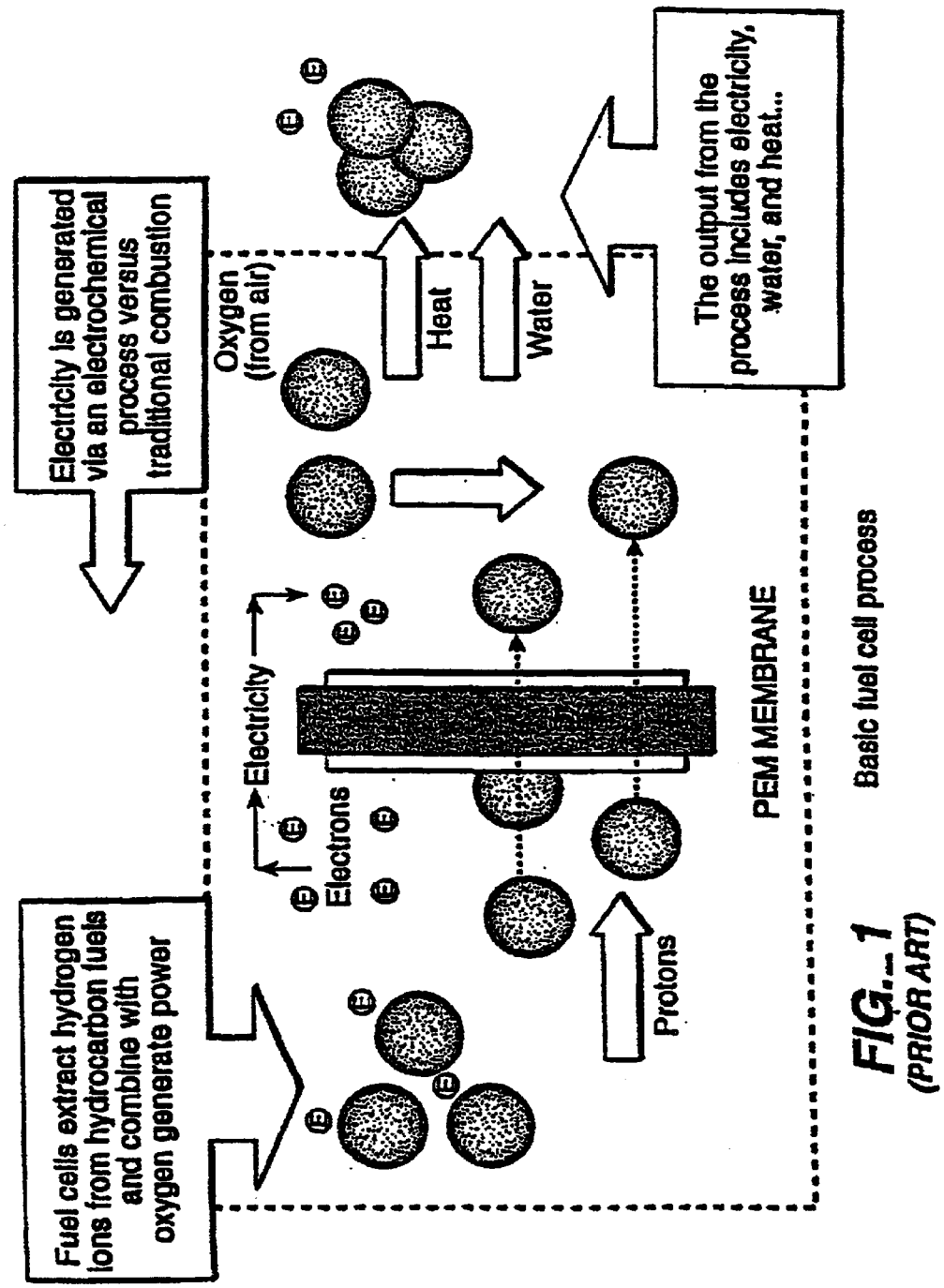
FIG._1
(PRIOR ART)

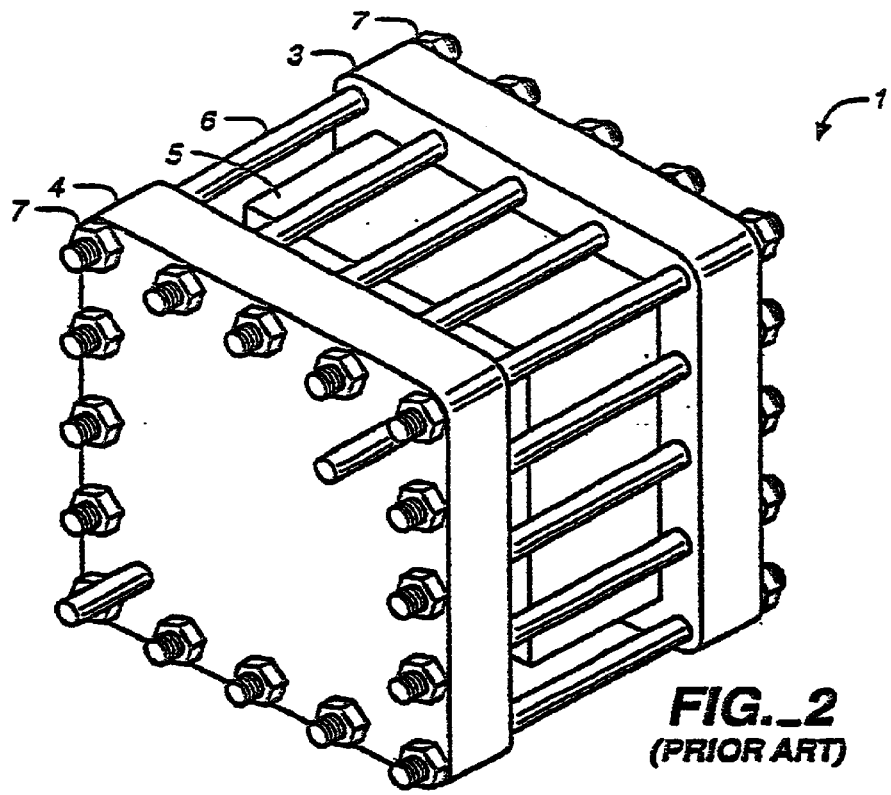
FIG._2
(PRIOR ART)
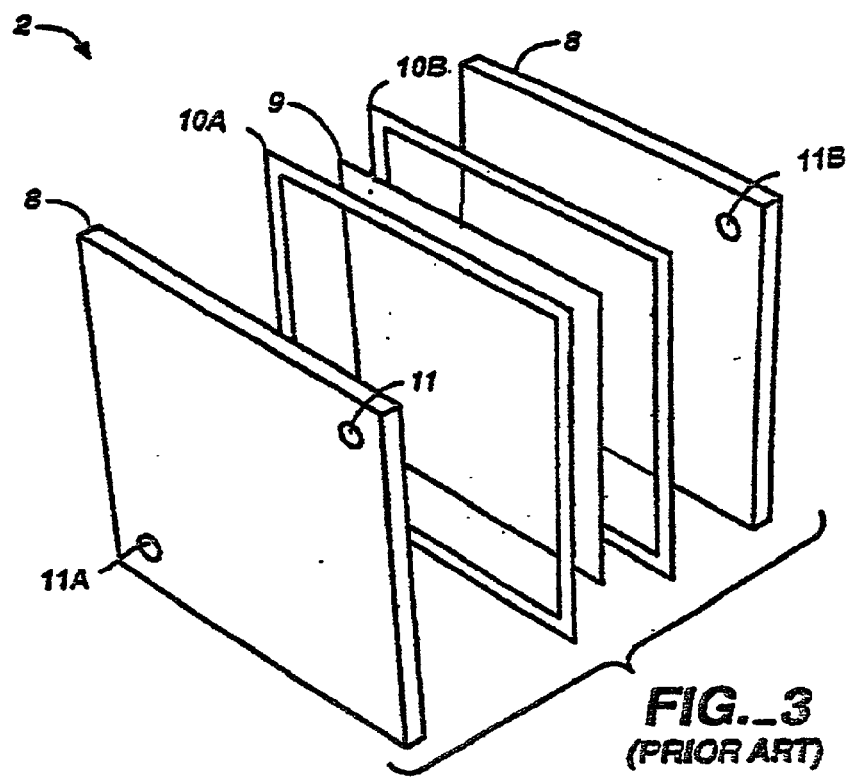
FIG._3
(PRIOR ART)

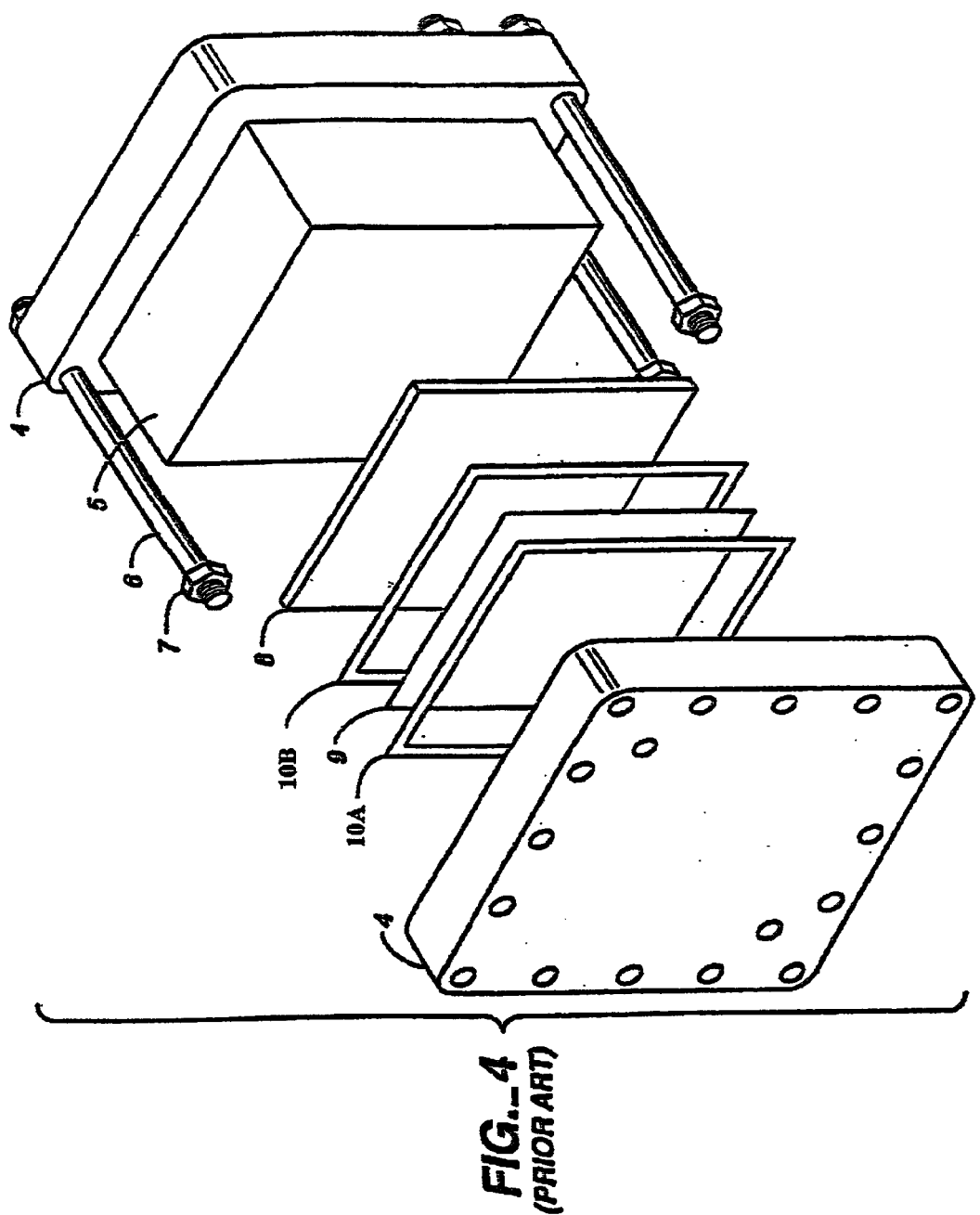
FIG._4
(PRIOR ART)

COMPLIANT ELECTRICAL CONTACTS FOR FUEL CELL USE

RELATED APPLICATIONS

This is a divisional application from U.S. patent application Ser. No. 09/834,390, filed Apr. 13, 2001 (now abandoned) which in turn claims priority from provisional U.S. patent application No. 60/226,471 filed Aug. 18, 2000. The present patent claims priority from both these related applications.

BACKGROUND OF THE INVENTION

1. Field of the Invention

This invention concerns compliant electrical contacts for fuel cell use to create, adjust and distribute internal forces and loads to optimize electrical connection and contact area to increase fuel cell performance. In a number of embodiments, an array of metal springs of different shapes and configurations contact the adjacent electrode.

2. Description of the Related Art

Fuel cells are energy conversion devices that use hydrogen (the most abundant element on earth) as a fuel, and oxygen, usually from the air, as an oxidant to create electricity through a chemical conversion process, without combustion and without harmful emissions. The voltage and current output of a fuel cell system depends on the number of cells in the stack, total active surface area and efficiency. The basic process, for a single cell is shown in FIG. 1.

Traditional fuel cell stacks 1, see FIG. 2, are made of many individual cells 2, see FIG. 3, which are stacked together. For the proper operation of the fuel cells the hydrogen gas fuel must be sealed inside the fuel cell and separated form the gaseous oxidant (air or oxygen). In some fuel cells, cooling is required because of the heat generated during normal operation. This heat is commonly removed from the fuel cell sacks by means of liquid cooling, typically using water as a coolant. The ability to achieve the required hydrogen and oxidant gas sealing as well as the liquid coolant sealing and to maintain intimate electrical contact between the bipolar plates 8 and the electrodes 9 has traditionally been accomplished with the use of relatively thick and heavy "end plates" 3, 4 with the fuel cell stack 5 held together by heavy tie-rods or bolts 6 and nuts 7 (or other fasteners) in a "filter-press" type of arrangement. (See FIGS. 2 and 4). Disassembly and analysis of fuel cell stacks built by traditional and other methods reveals evidence of incomplete electrical contact between bipolar separator plates (BSPs) 8 and the membrane electrode assemblies (MEAs) 9, which results in poor electrical conduction, lower cell performance, often along with evidence of gas and liquid leakage.

The traditional method of assembly of Proton Exchange Membrane (PEM) fuel cells requires several parallel and serial mechanical processes that must be accomplished simultaneously for each individual cell, see FIG. 3.

The Membrane Electrode Assembly (MEA) 9 must be sealed to the Bipolar Separator Plates (BSPs) 8 at each plate/MEA interface, via a gasket 10A and 10B. The fuel, oxidizer and coolant manifolds 11, 11A and 11B are all required to be sealed at the same time during fabrication as the MEA is sealed to the BSP. The BSPs 8 must be in intimate electrical contact with the electrode assembly 9, across its entire surface area, at all times for optimum performance.

As the traditional fuel cell stack 1 is assembled, each individual cell (layer) 2 must seal, manage gasses and liquid, produce power and conduct current. Each cell relies on all the other cells for these functions. Additionally, all seals and electrical contacts must be made concurrently at the time of assembly of the stack. (See FIGS. 2 and 3).

The assembly of a traditional PEM cell stack which comprises a plurality of PEM cells each having many separate gaskets which must be fitted to or formed on the various components is labor-intensive, costly and generally unsuited to high volume manufacture due to the multitude of parts and assembly steps required.

The traditional construction method does not allow for testing or evaluation of the individual cells before they are assembled into the stack. If there is leakage or a performance problem with a single cell or group of cells in an assembled stack, then the entire stack has to be disassembled to correct the problem. This is very expensive and time consuming.

Some patents of interest are listed below. U.S. Pat. No. 5,683,828 discloses metal platelet fuel cells production and operation methods. U.S. Pat. No. 5,858,567 discloses fuel cells employing integrated fluid management platelet technology. U.S. Pat. No. 5,863,671, discloses plastic platelet fuel cells employing integrated fluid management. U.S. Pat. No. 6,051,331 discloses fuel cell platelet separators having coordinate features. These four U.S. patents describe conventional fuel cell assembly.

U.S. Pat. No. 6,030,718 describes a proton exchange membrane fuel cell power system. In the figures of this patent, particularly its FIG. 12 and following, component 202 is described as a "biasing" assembly, namely a plurality of metal wave springs which cooperate with the cathode cover and impart force to the adjacent pressure transfer assembly 203 through a rigid pressure distribution assembly 204. These springs are not described or claimed as contacts.

Other of general interest includes, for example, European Patent 446,680 and U.S. Pat. Nos. 5,338,621, 5,328,779, 5,084,364, 4,445,994, 5,976,727, 5,470,671, 5,176,966, and 5,945,232. All of the references, patents, standards, etc. cited in this application are incorporated by reference in their entirety.

The above discussion shows that existing fuel cell technology can be improved with modification in the design and fabrication of fuel cell components, and in the assembly of the units. The present invention of compliant electrical contacts provides such improvements.

SUMMARY OF THE INVENTION

The present invention concerns a single compliant electrical contact or an array of independently-acting compliant electrical contacts within a fuel cell electrode. This invention improves fuel cell operation by providing substantially uniform internal load distribution to effect uniform electrical contact across the conductive surface.

In one embodiment of the invention, the compliant electrical contacts are metal springs, which can take a number of forms, including but not limited to an inverted V (or U), Z, S or omega shape. The contacts can be connected to a conducting base plate or BSP in a number of ways, including electrical, mechanical or metallurgical connections, or combinations thereof.

The contacts can be arranged in a regular pattern, providing substantially uniform distance between contact surfaces or they can be arranged in an irregular pattern, providing a non-uniform distance between contact surfaces.

The contacts can be made of many conducting substances, including but not limited to alloys of iron, copper, gold, silver, platinum, aluminum, nickel, chromium, and combinations thereof.

BRIEF DESCRIPTION OF THE DRAWINGS

FIG. 1 is a schematic representation of the basic conventional fuel cell process. It shows the extracted hydrogen ions that combine with oxygen across a PEM membrane to produce electrical power.

FIG. 2 shows a conventional PEM fuel cell stack of electrodes compressed together with heavy end plates and tie rod bolts.

FIG. 3 is an exploded view of a conventional PEM single cell of a fuel cell assembly.

FIG. 4 is an exploded view of a conventional PEM fuel cell stack of electrodes showing the arrangement of the internal and external parts.

FIG. 9A is a profile of a rounded, inverted V or U shape contact spring.

FIG. 9B is a profile of an "S" shape contact spring with a right angle contact.

FIG. 9C shows an S-shaped spring contact in a multiple array strip form.

FIG. 9D is a profile of a Z-shaped spring contact with flat contact area.

FIG. 9E shows Z-shaped contact springs in a multiple array strip form.

FIG. 9F show an omega-shaped contact spring, with multiple deflection areas and multiple contact areas.

FIG. 9G shows omega-shaped contact springs in a multiple array strip form.

DETAILED DESCRIPTION OF THE INVENTION AND CERTAIN EMBODIMENTS

The following definitions are used in this patent:

"BSP" refers to bipolar separator plates.

"Compliant electrical contact" refers to a spring-like or other flexible adjusting electrical contact that creates the contact loads and pressures of an operating fuel cell and maintains substantially constant electrical contact.

"MEA" refers to the membrane electrode assembly.

"PEM" refers to proton exchange membrane—a type and component of a fuel cell.

As known from the literature and from experience, it is advantageous to optimize the area of contact between the electrical contacts, whatever their configuration, and the membrane electrode assembly. This is the case even for conventional fuel cell configuration such as shown in FIGS. 2 through 4 as well as in all embodiments of the present invention. In all embodiments of the present invention, regardless of spring shape, the contact areas of the springs on the MEAs should optimize the physical contact area to the MEA to facilitate electrical conduction and reduce electrical resistance.

As stated above, traditional fuel cell design has relied on the "filter press" type of fabrication and assembly, see FIGS. 2, 3 and 4, including end-plates and tie-rods, in an attempt to create suitable electrical contact between the MEA and adjacent BSP. These designs have not made use of other forms of electrical contact such as (1) metallurgical contact, by methods such as welding, soldering or brazing, (2) mechanical contact such as fastened with bolts, screws, cams, etc., and (3) spring contacts such as battery clips or wall plugs. As a method of decoupling the electrical contacts from the sealing requirements, spring-like electrical contacts of the present invention are a novel solution and add mechanical compliance.

While compliant electrical contacts can be used with traditional bipolar separator plates, more typically they would be used with thin metal plate BSPs in which the reactant gas flow patterns are integrated as with the present embodiment. Each BSP is independently held in intimate contact with the MEA via independent acting compliant spring electrical contacts and do not require the heavy end plates, tie rods and the massive compressive forces required of traditional fuel cell stacks to achieve contact and conductance.

Conventional fuel cell design is followed up to a certain point. See U.S. Pat. No. 6,030,718 and the other U.S. patents listed above. One of skill in the art with these incorporated-by-reference U.S. patents will have the basic design to fabricate a conventional fuel cell. With the text and figures provided herein, one of skill in the art is enabled to fabricate the present invention. In the creation of the compliant electrical contacts of the present invention within the cell, the following additional methodology may be followed.

Figure 5:
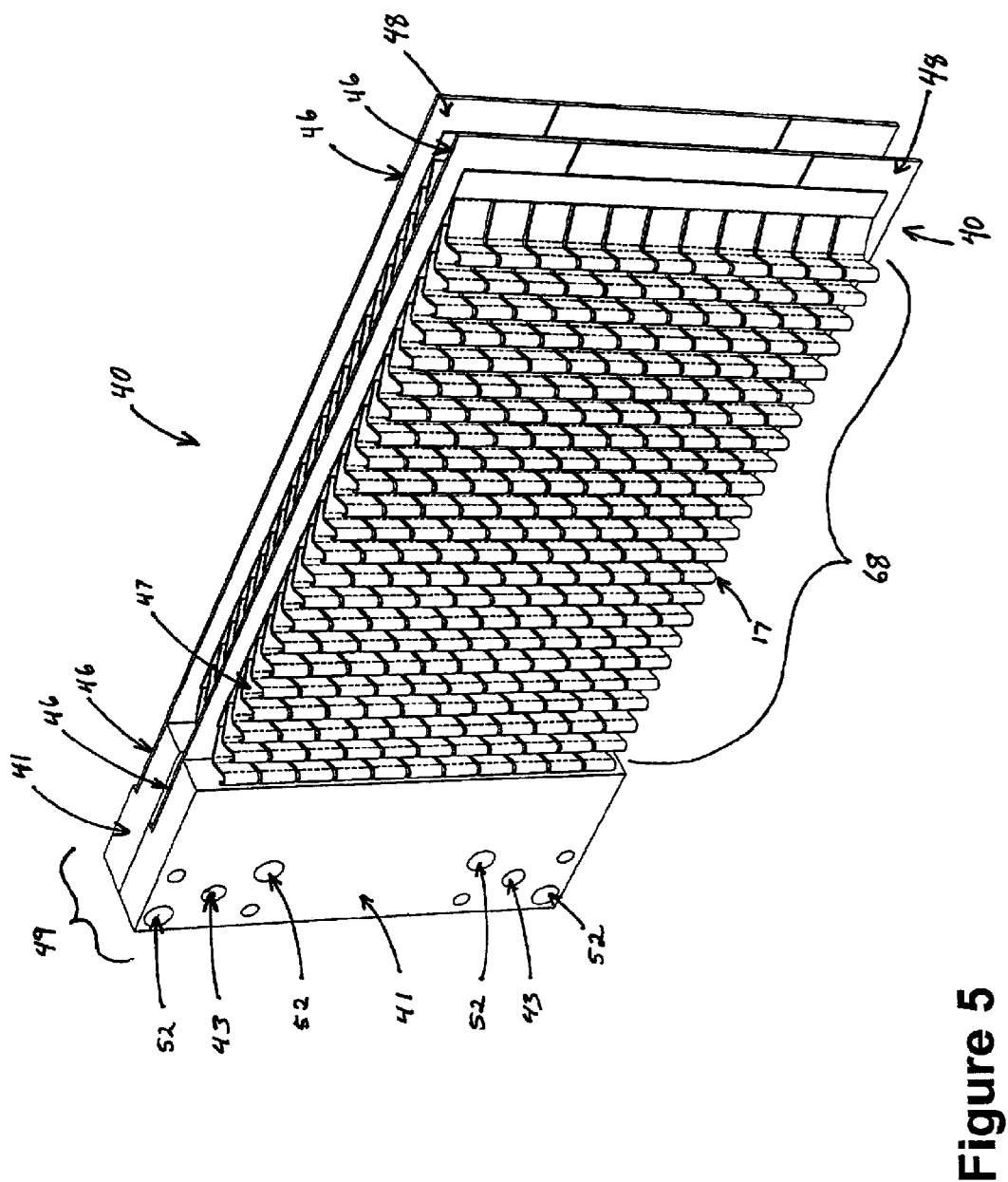
FIG. 5 shows compliant electrical contacts in the form of an array of cantilevered inverted V or U-shaped metal springs assembled within a fuel cell stack.
Figure 5A:
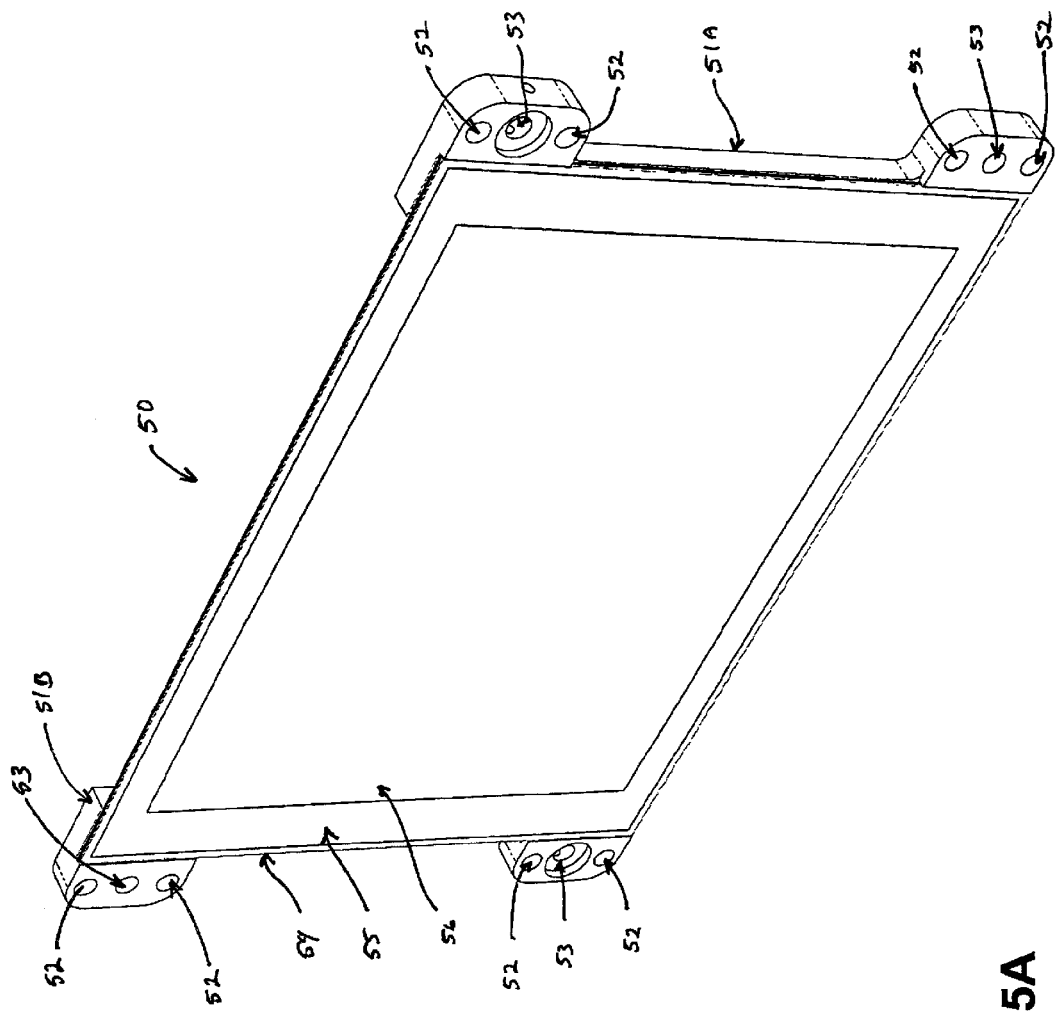
FIG. 5A shows an integrated and modular bipolar separator plate (BSP), membrane electrode assembly (MEA) and manifold.
Figure 5B:
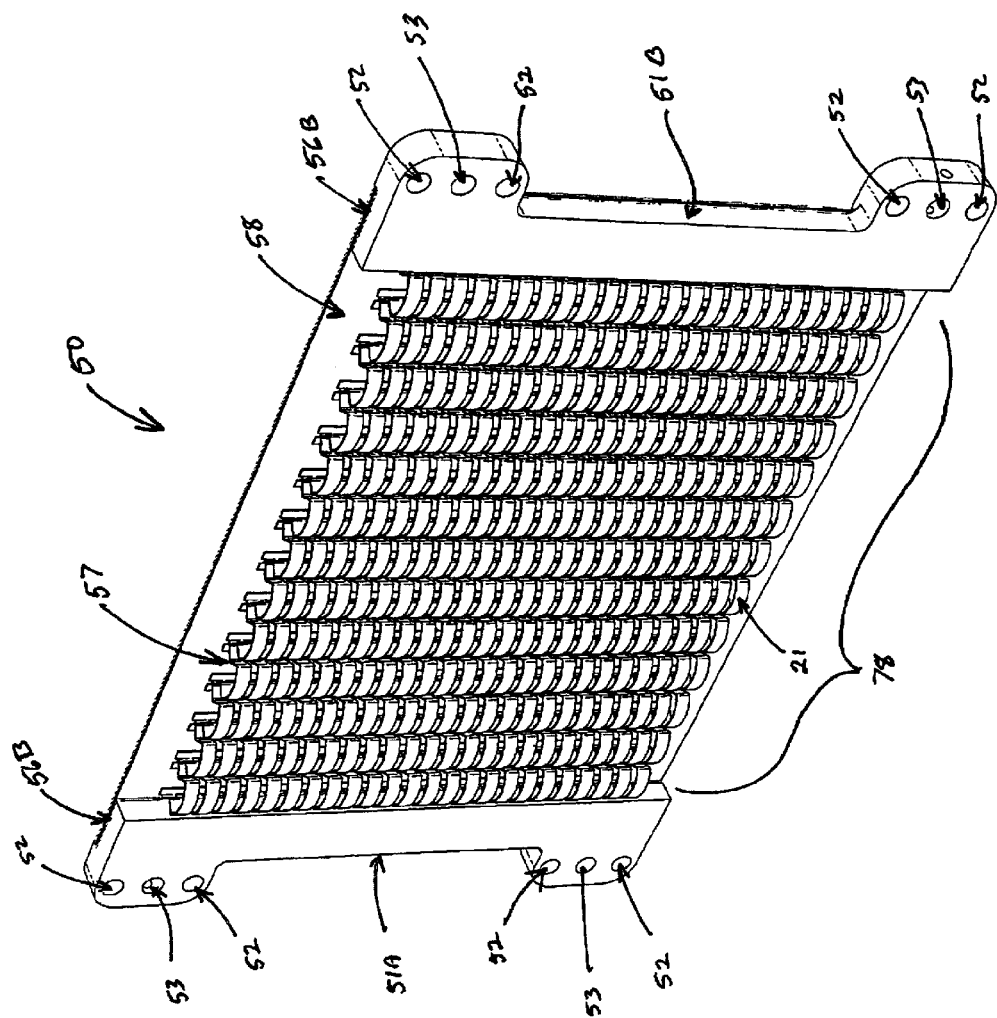
FIG. 5B shows an integrated and modular Bipolar Separator Plate (BSP) and array of omegashaped compliant spring contacts, as seen from the opposite perspective of FIG. 5A.
Figure 5C:
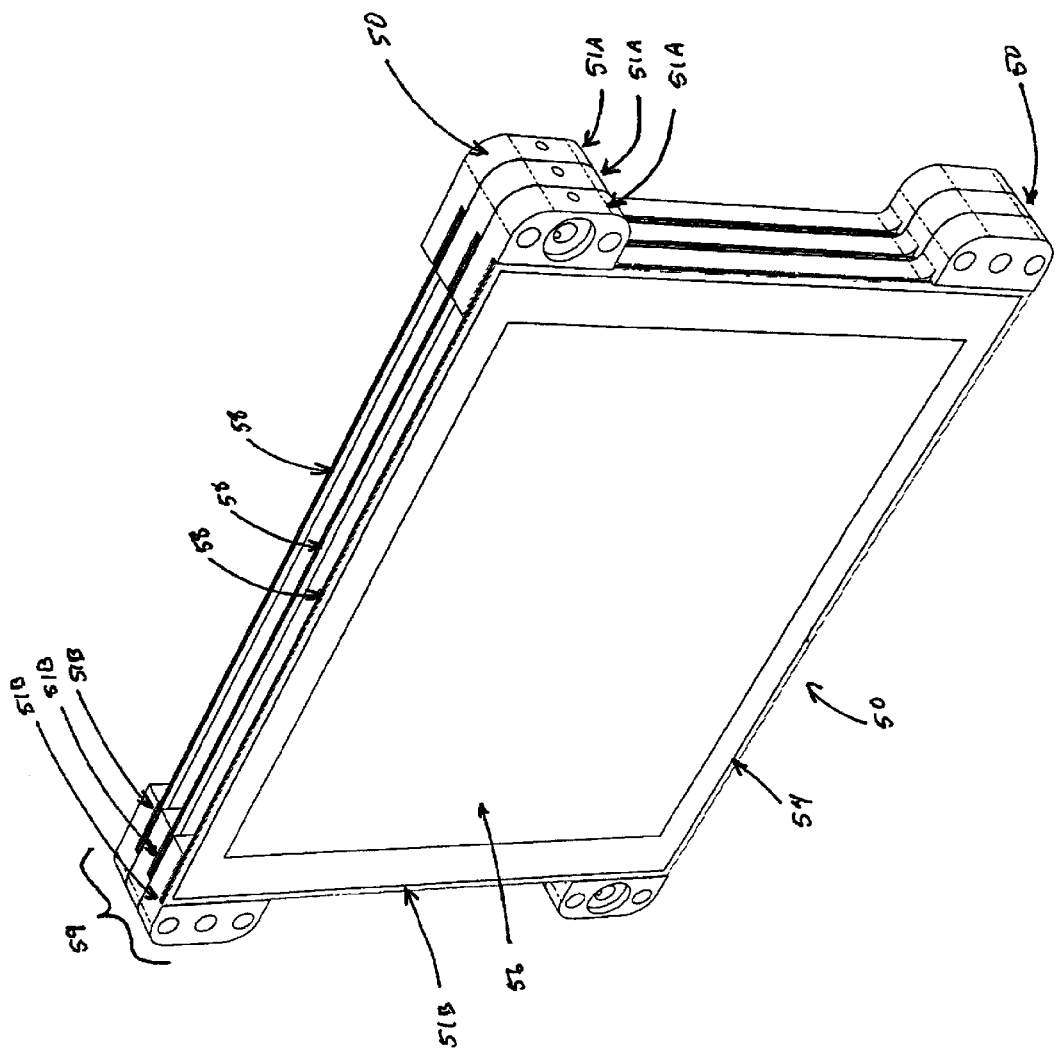
FIG. 5C shows a fuel cell stack comprised of modules as depicted in FIGS. 5A and 5B.

FIGS. 5, 6, 7, and 8 show one embodiment of a fuel cell 40 according to the present invention, and FIGS. 5A, 5B and 5C show another embodiment 50. These figures show single thin metal plate BSPs 48, 58 onto which the MEAs 46, 56 and reactant manifolds 41, 51A, and 51B are assembled into modular units 40, 50 prior to being incorporated into complete fuel cell units (stacks) 49, 59. The BSPs 48, 58 may contain a reactant flow pattern, and the MEAs 46, 56 may or may not have an incorporated diffusion layer, as well as separate diffusion layers if needed. The modules also may have an adhesive or an adhesive backed gasket or seal 55, reactant manifolds 41, 51A and 51B, and manifold seals or adhesives 46b, 56b. Other features depicted in these figures include tie rod holes 52, reactant passageway 43, 53, edge seal 54, inactive border 55 and active MEA 56.

Figure 6:
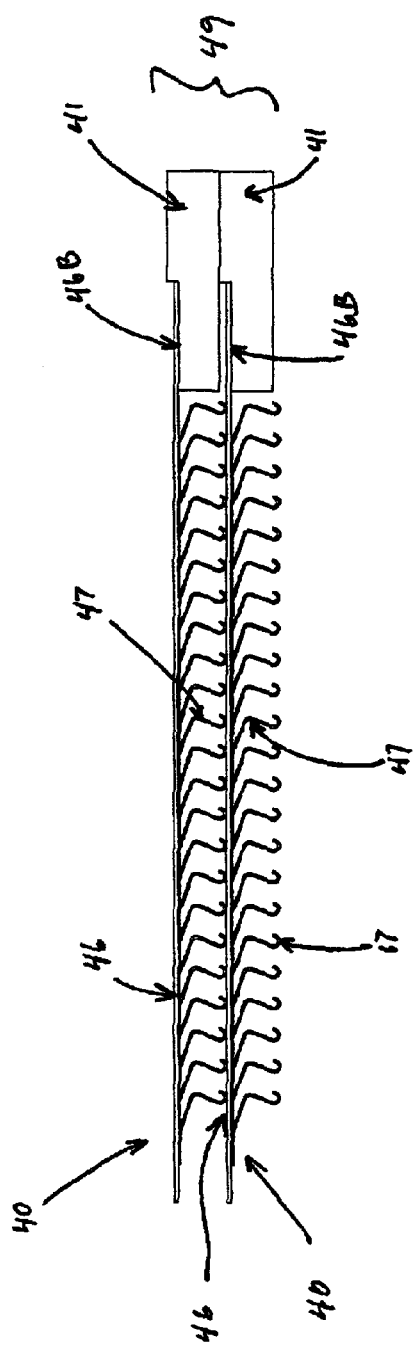
FIG. 6 is a cross-sectional side view showing compliant electrical contacts, in the form of an array of cantilevered inverted V or U-shaped springs, contacting the adjacent MEA.
Figure 7:
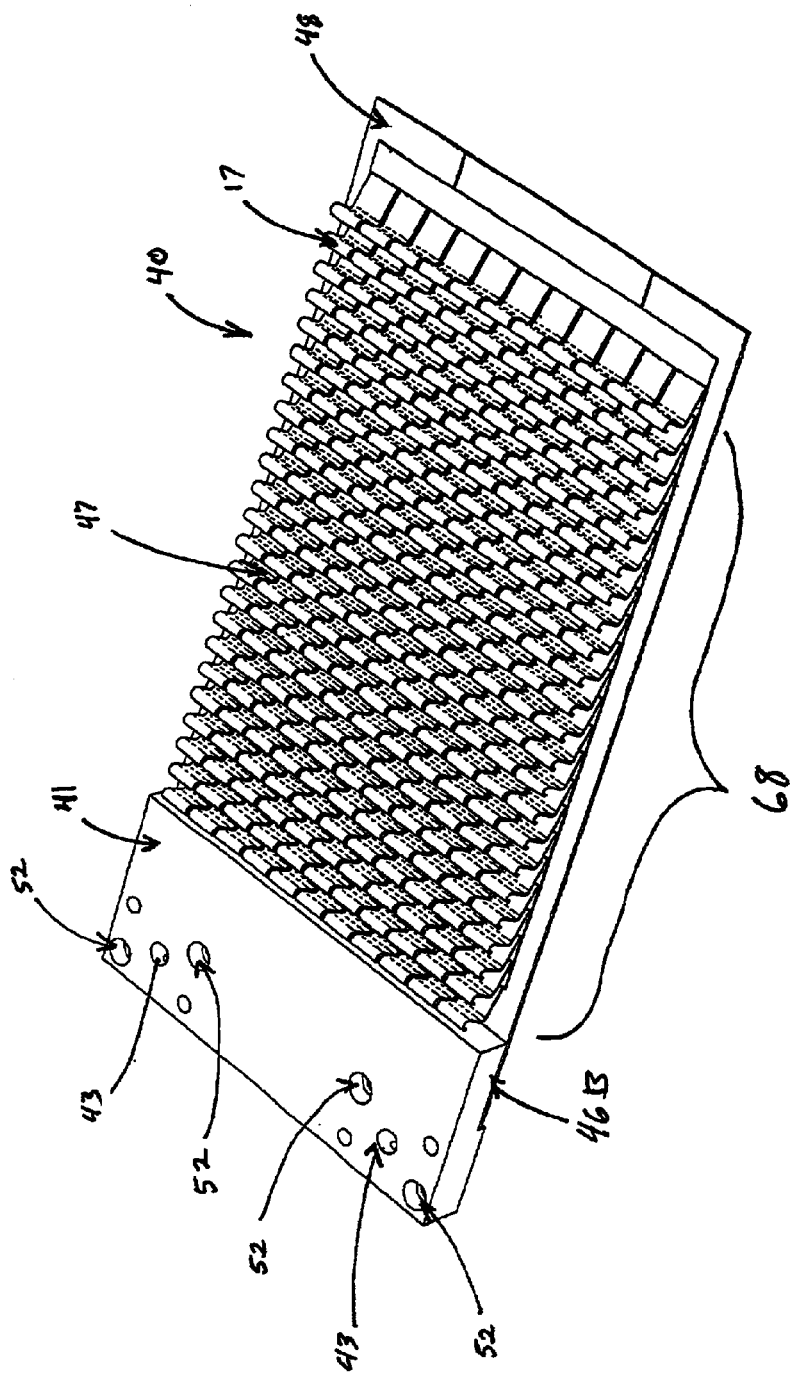
FIG. 7 shows compliant electrical contacts in the form of an array of inverted V or U-shaped cantilevered springs.
Figure 8:
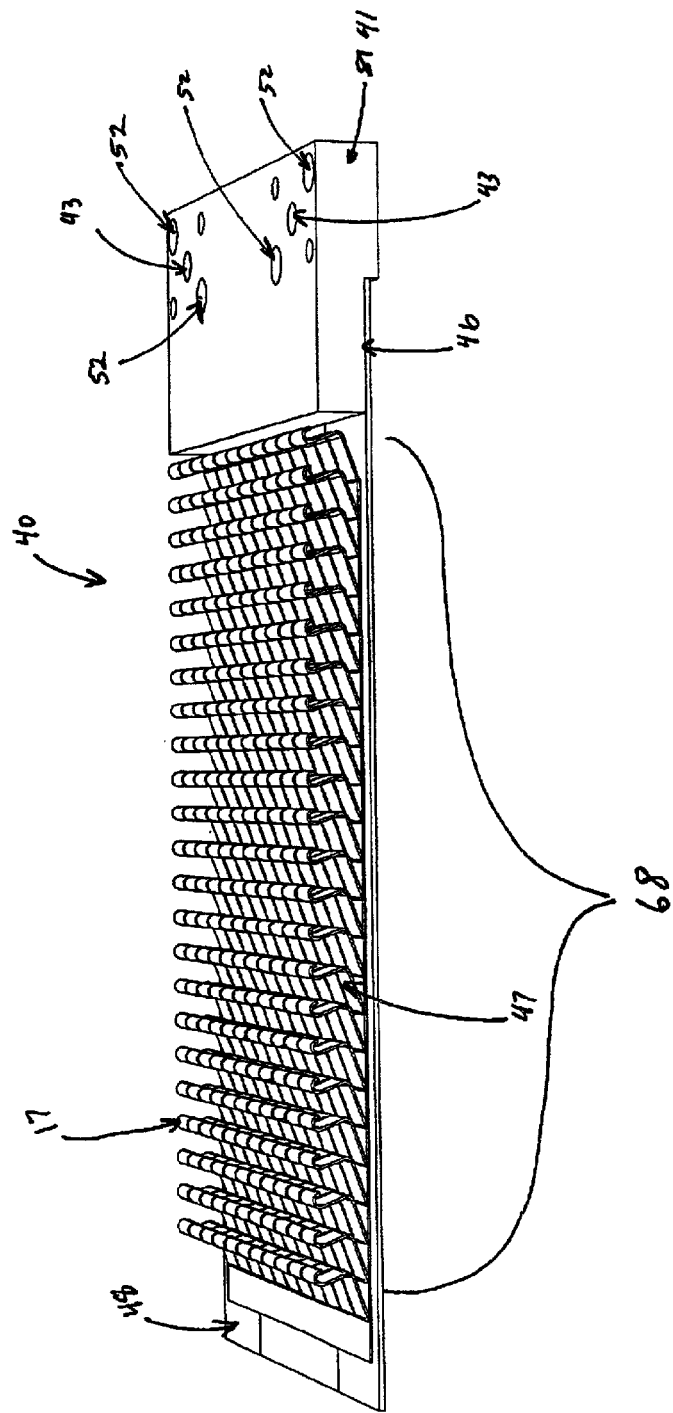
FIG. 8 is an oblique end or edge view of the compliant electrical contacts of FIG. 7.

In the embodiments depicted in FIGS. 5 through 8, compliant electrical contact is achieved by springs 47 (FIG. 9A). 57 (FIGS. 9F and 9G), and contact areas or points 17, 21 that are located on the springs. In these designs, an array of individual springs 68, 78 is attached to each BSP, and each spring makes intimate contact with the MEA attached to the adjacent BSP. When these springs are compressed, continuous electrical contact is assured between the adjacent BSPs through the MEA 46, as depicted in FIG. 6.

The compliant electrical contacts can take a number of forms. All units are flexible. For example, FIGS. 5, 6, 7 and 8 show contact points in the inverted U or V-shape of FIG. 9A. Other shapes are shown in FIGS. 9B, 9C (S shaped), 9D and 9E (Z shaped). FIGS. 5B, 5C show the compliant electrical contacts in the omega shape of FIGS. 9F and 9G.

Figure 9A:
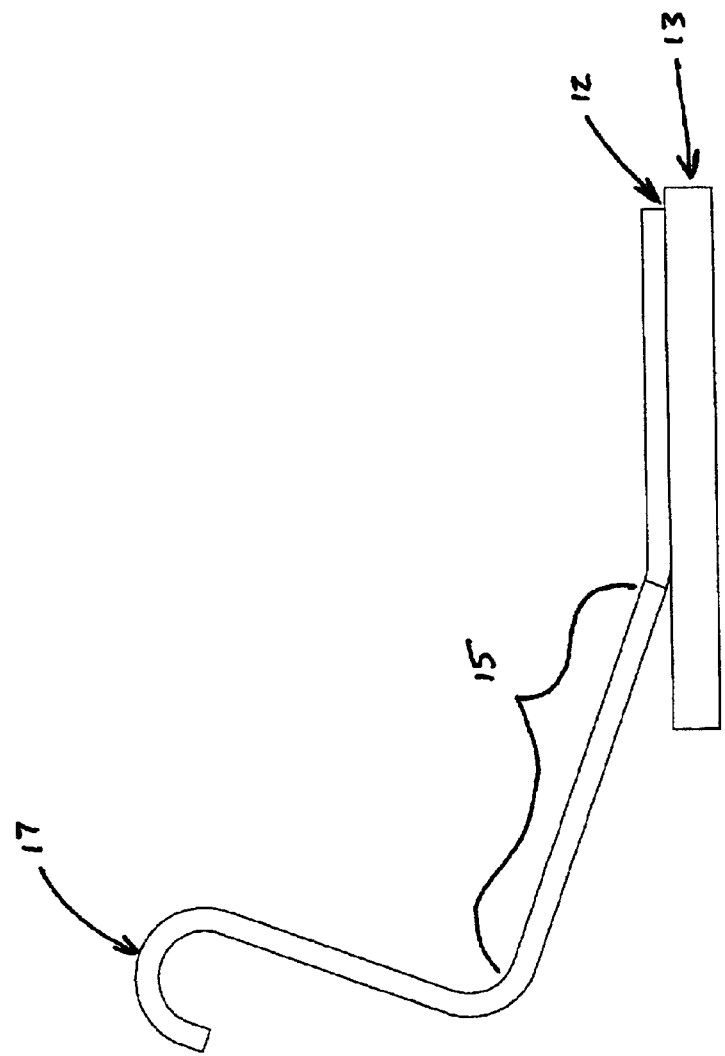
FIGS. 9A, 9B, 9C, 9D, 9E, 9F and 9G depict some of the various types of compliant electrical contacts.
Figure 9B:
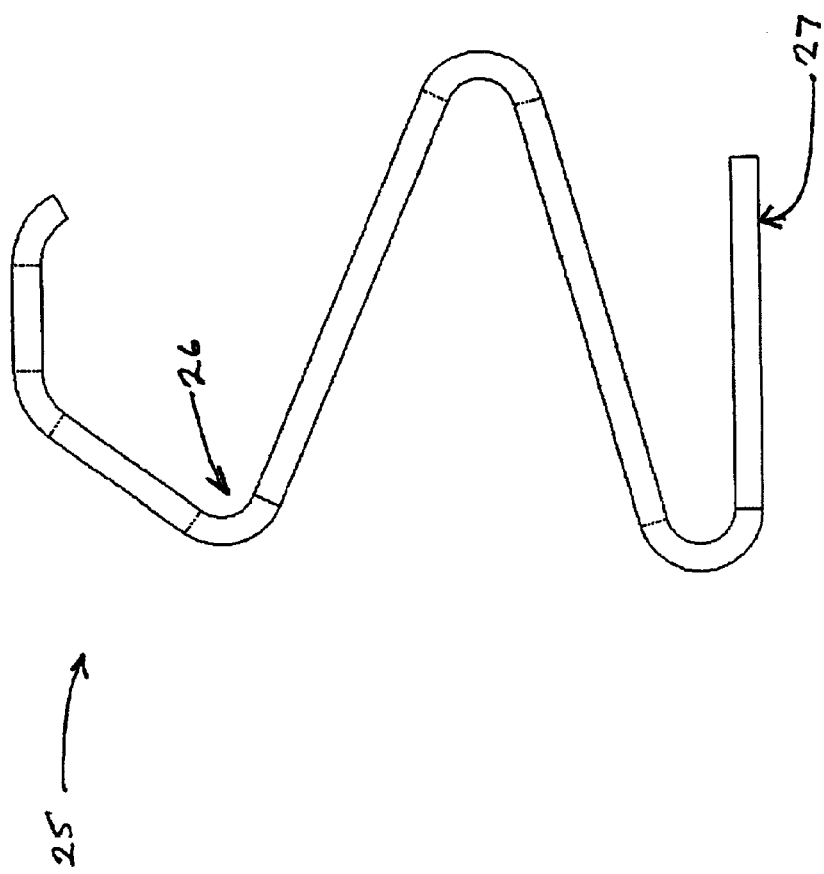
Figure 9C:
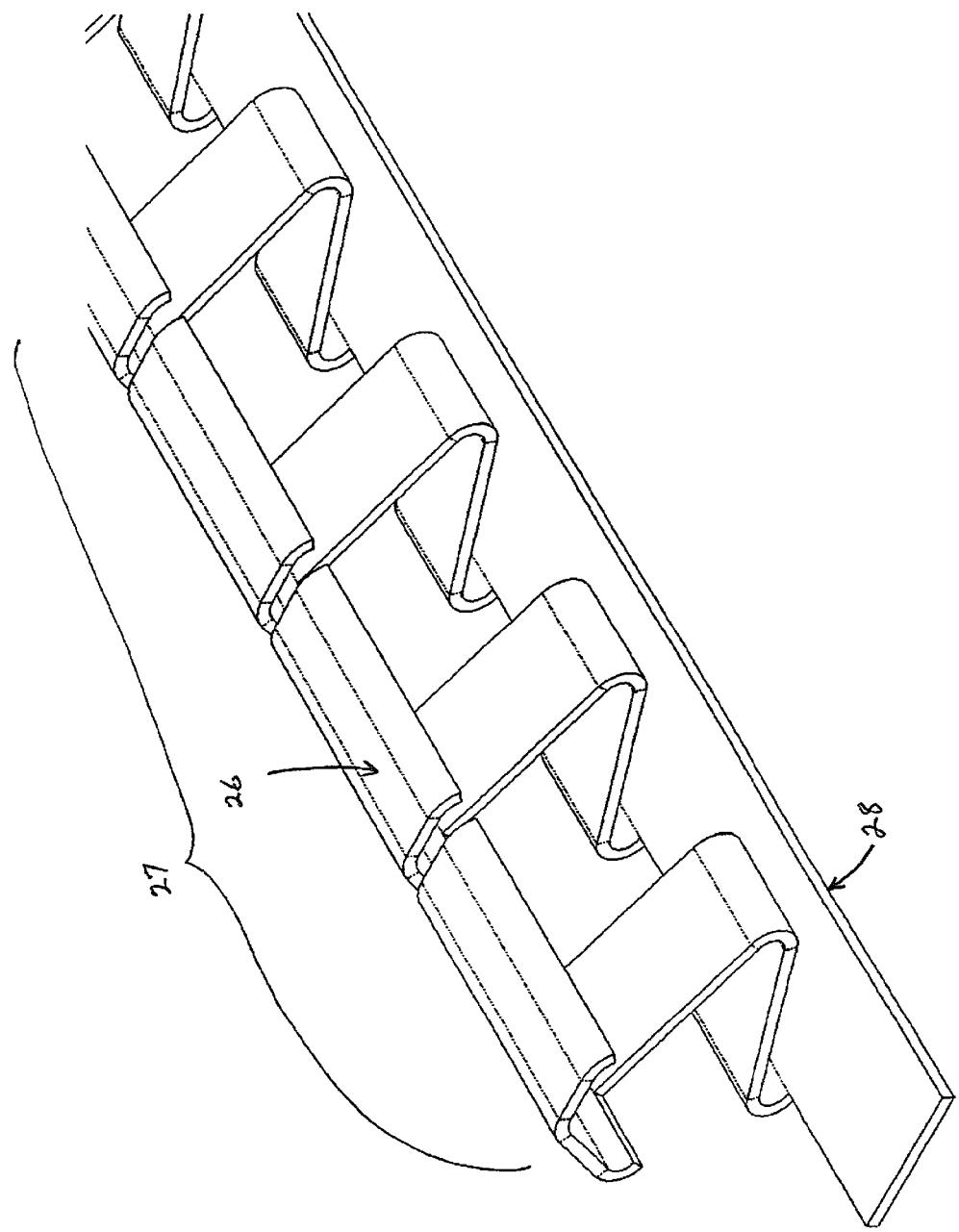

FIG. 9A shows a rounded V or U form 17 having a cantilevered portion 15 which is attached through 12 to the BSP or base plate 13. One side of the inverted V or U-shape is connected mechanically and electrically to a conducting base. The points of the inverted V or U configuration provide electrical and mechanical contact to the electrode. As each individual spring contacts the electrode, it adjusts to the variation in cell spacing and maintains substantially uniform electrical contact with the MEA. (See FIGS. 5, 6, 7, and 8).

FIG. 9B is an "S" shape 25 with right angle contact 26 having a flat area 27 to connect to a base plate and multiple deflection points or areas.

FIG. 9C is an array of "S"-shape springs 26 of FIG. 9B, wherein the array of S-shape contacts is connected to a base plate 28.

Figure 9D:
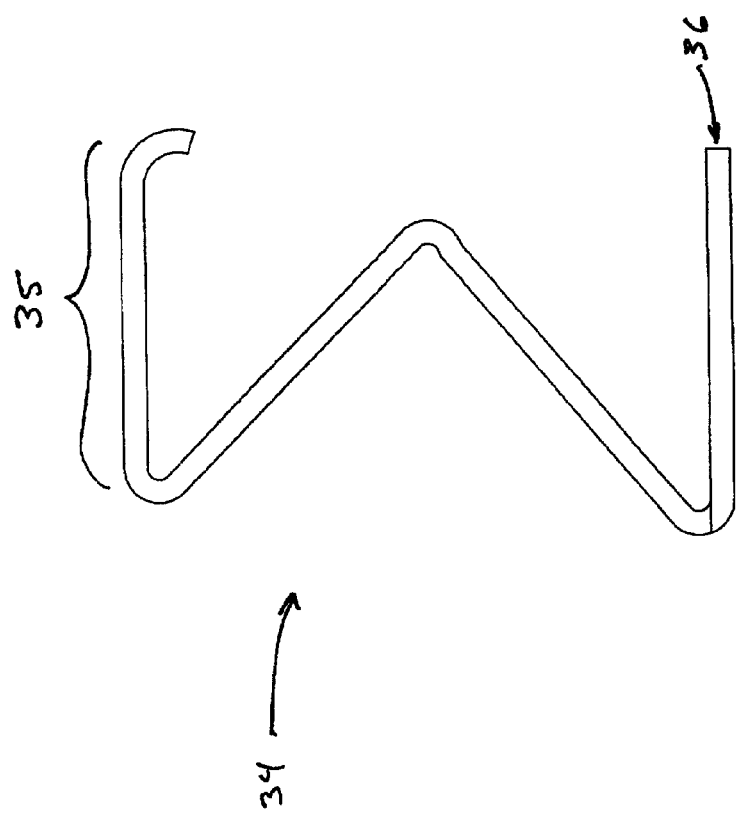

FIG. 9D is a "Z" form 34 with right angle contact area 35. The Z-shape spring is connected to a base 36 and has multiple deflection points or areas.

Figure 9E:
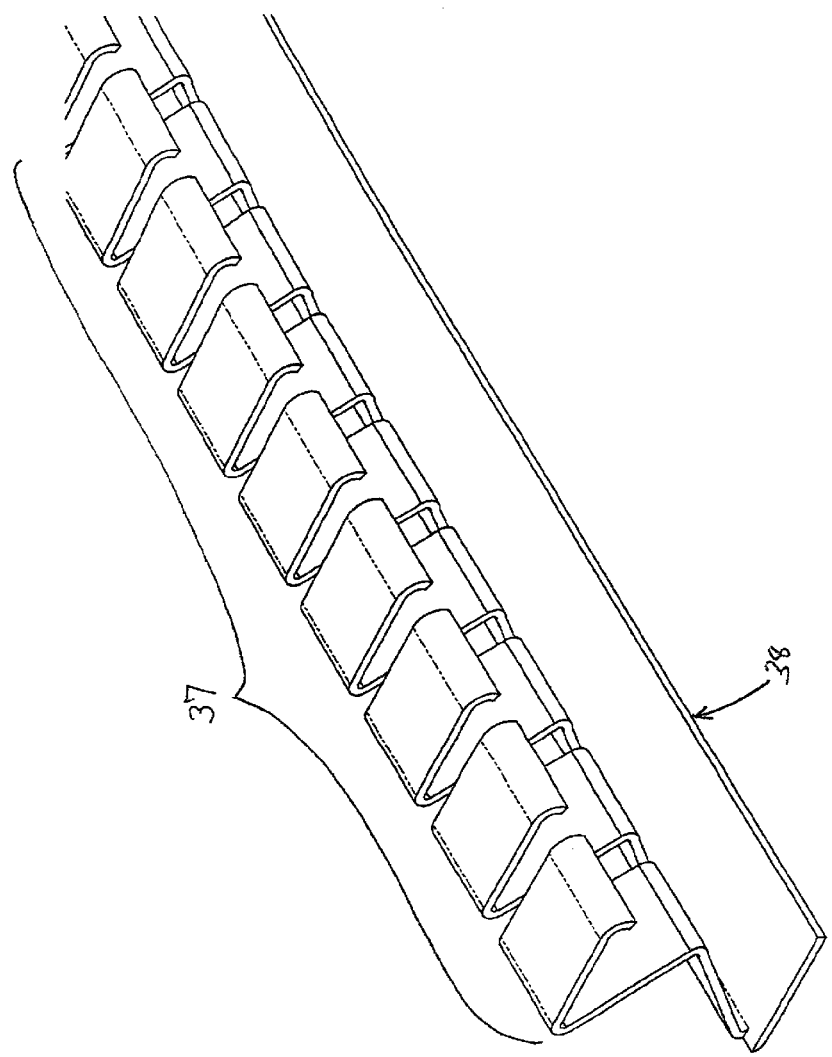

FIG. 9E is an array 37 of the Z-shape springs of FIG. 9D which is connected to base 38.

Figure 9F:
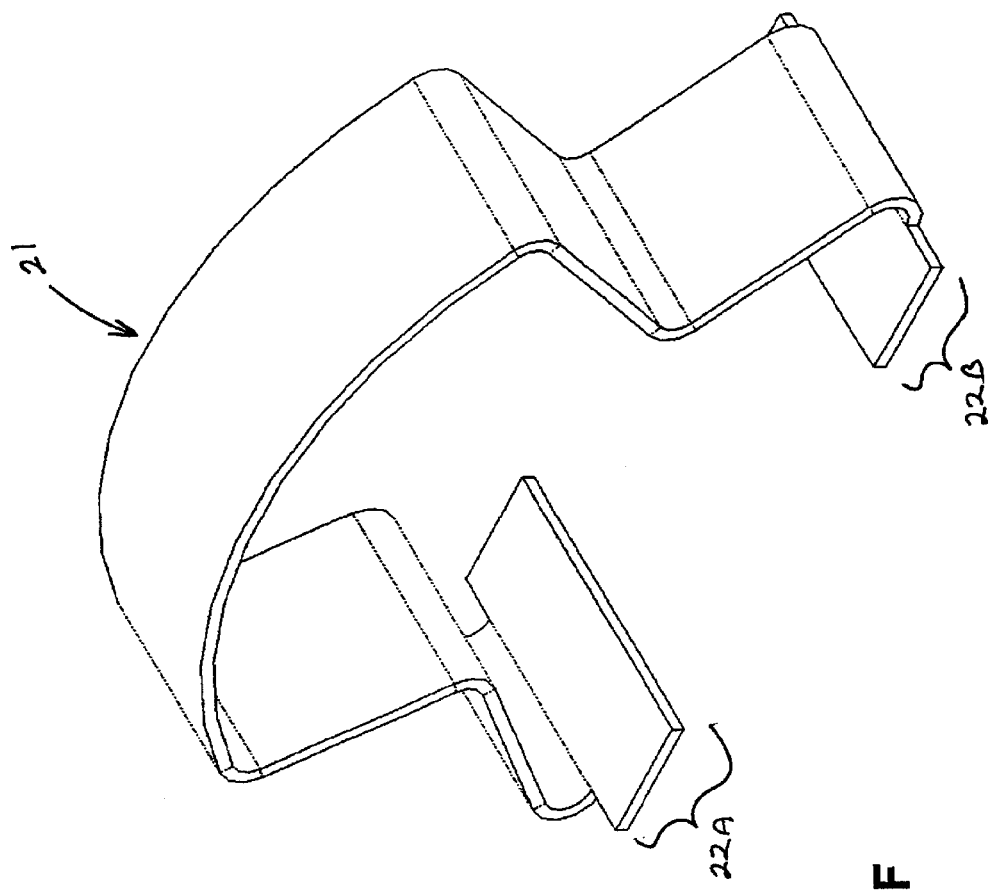

FIG. 9F depicts a extension of the S-shape of FIG. 9B in which two "S" springs. FIG. 9B, are arranged "face to face" and their contact areas extended and joined thereby forming an omega shape which deflects within its own footprint. In addition, this shape advantageously and concurrently optimizes the contact area of the spring with the MEA. In this omega shaped spring, there is a tapered middle section with a width at least 50% as great as the height of the spring. FIG. 9F shows the omega shape 21, with multiple deflection areas and multiple contact areas. One or both flat portions 22A and 22B are in contact or connected to a base plate.

Figure 9G:
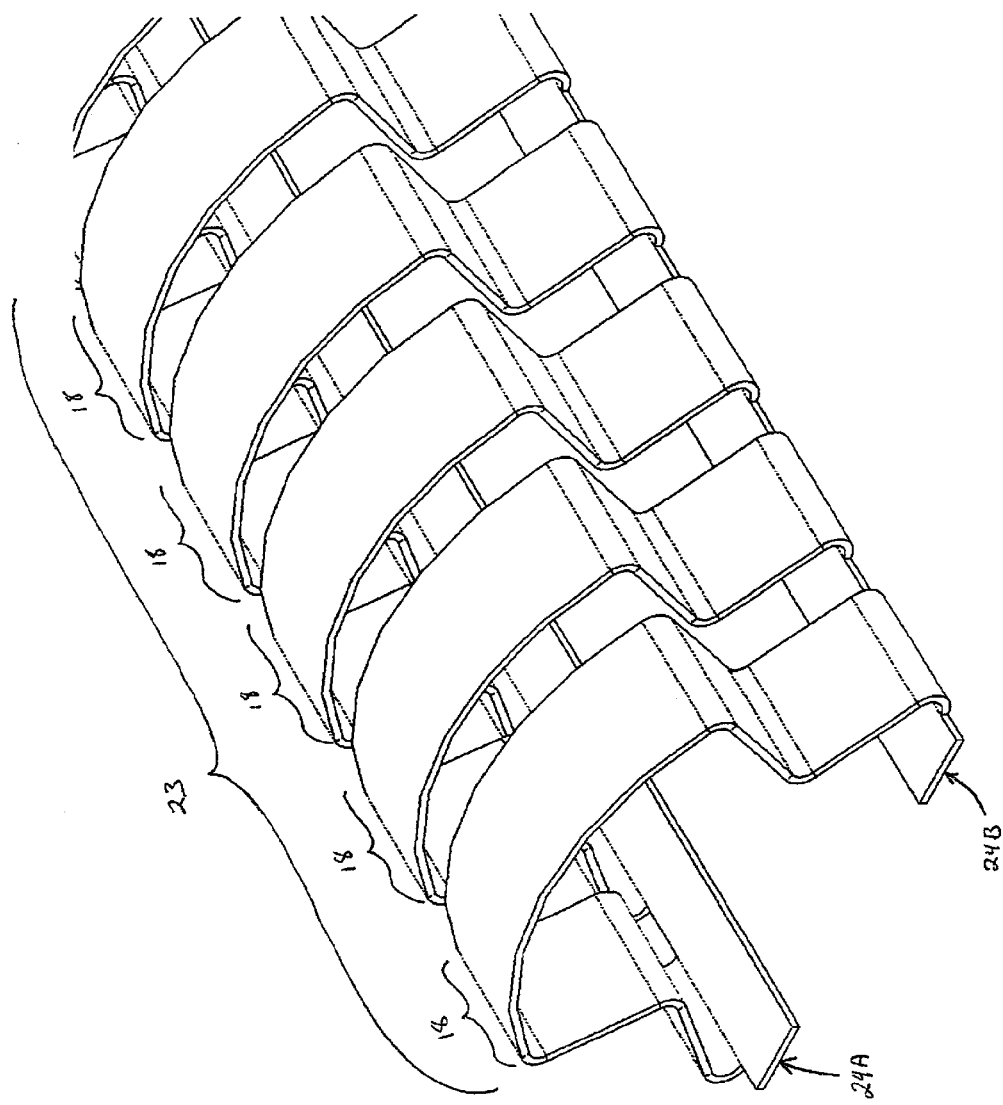

FIG. 9G is an array 23 of the omega shape springs in strip form 18 that are contacted or connected to the base plate 24A and 24B. The array 23 of FIG. 9G is shown incorporated into the modular cell and stack of FIGS. 5A, 5B and 5C.

In order to maximize the contact area to the MEA and maximize the number of contacts, it is advantageous but not necessary to have the compliant contacts deflect within their own "footprint". allowing a higher density of compliant contacts. Each of the designs described above in FIGS. 9B through 9G will deflect within their own "footprint".

The compliant electrical contacts or spring approach is not limited by size or shape of the application. The springs are usually between 0.020" and 2" high. The forces (e.g. contact pressure) in the spring within the cell are usually between about 0.10 lb and 10 lb per spring leaf, depending on the configuration as described herein. The plates are as small as ¼"×¼" (for very small, light, portable devices such as video cameras, movie cameras, etc.) to the large sizes required for homes, businesses, large buildings, or even small cities.

A variety of materials may be used for such compliant electrical contacts. Gold plate is the obvious choice due to its resistance to the high humidity atmosphere associated with fuel cell operation and its corrosion resistance. Spring-loaded contacts fabricated from stainless steel (without gold plating) were used to demonstrate the technology with significant performance improvement over expected results.

One preferred method of fabrication is to etch, stamp or coin the metal conducting plates (BSP), etch or stamp the spring or compliant contact blank and form the compliant contact to shape by stamping. The plates and compliant contacts may be formed by other methods familiar to those skilled in the art. The compliant contact(s) then may be attached to the conducting plate by welding or via pre-applied solder paste and soldered using conventional electronic circuit board manufacturing equipment and techniques or may be solely in mechanical and electrical contact. This embodiment provides a uniform thermal gradient, especially when the compliant electrical contacts are oriented vertically in the fuel cell stack. This configuration creates a chimney effect in a natural convection fuel cell and increasing the amount of air (oxygen) to the membrane. The rising heated air, due to the chimney effect, carries the excess heat away. This is a desirable feature. Of course this is not meant to exclude the use of forced or pressurized gasses (air, oxygen, hydrogen, etc.) or other reactants.

While only a few embodiments of the invention have been shown and described herein, it will become apparent to those skilled in the art that various modifications and changes can be made in the compliant electrical contacts and applications to provide long-term substantially uniform or non-uniform spacing between electrodes and consistent electrical contact of electrodes in a fully functioning fuel cell device without departing from the spirit and scope of the present invention. Furthermore, the dimensions, materials and processes recited herein are for purposes of illustration, and are not meant to exclude the use of other dimensions, materials or processes.

What is claimed is:

1. A fuel cell assembly comprising:
   a membrane electrode assembly;
   a bipolar separator plate; and
   independently-acting compliant electrical contacts attached to said bipolar separator plate, for pressing against but not permanently attaching to a membrane electrode assembly of an adjacent fuel cell assembly.

2. A fuel cell stack, comprised of a first assembly according to claim 1 and a second assembly according to claim 1, wherein the independently-acting compliant electrical contacts of said first assembly are in electrical contact with but are not permanently attached to the membrane electrode assembly of said second assembly.

3. The fuel cell assembly according to claim 1 wherein said independently-acting compliant electrical contacts comprise springs.

4. The fuel cell assembly according to claim 1, wherein said springs are inverted-V shaped.

5. The fuel cell assembly according to claim 1, wherein said springs are S-shaped.

6. The fuel cell assembly according to claim 1, wherein said springs are Z-shaped.

7. The fuel cell assembly according to claim 1, wherein said springs are omega-shaped, wherein said omega-shaped springs have a height and a tapered middle section, said tapered middle section having a width, and wherein said width is at least 50% as great as said height.

8. The fuel cell assembly according to claim 1, wherein said independently-acting compliant electrical contacts are formed into an array having a length, wherein said membrane electrode assembly has a length, and wherein said length of said array is approximately equal to said length of said membrane electrode assembly.

9. The fuel cell assembly according to claim 1 wherein said independently-acting compliant electrical contacts are formed into an array having a width, wherein said membrane electrode assembly has a width, and wherein said width of said array is approximately equal to said width of said membrane electrode assembly.

10. The fuel cell assembly according to claim 8 wherein said independently-acting compliant electrical contacts are formed into an array having a width, wherein said membrane electrode assembly has a width, and wherein said width of said array is approximately equal to said width of said membrane electrode assembly.

11. A method for maintaining electrical contact between a bipolar separator plate and a membrane electrode assembly in a fuel cell stack comprising attaching independently-acting compliant electrical contacts to said bipolar separator plate and positioning said independently-acting compliant electrical contacts so as to press against but not permanently attach to said membrane electrode assembly.

12. A fuel cell assembly comprising:
    a membrane electrode assembly;
    a bipolar separator plate; and
    flexible means attached to said bipolar separator plate and pressed against but not permanently attached to said membrane electrode assembly for making electrical contact between said membrane electrode assembly and said bipolar separator plate.

13. A fuel cell assembly comprising:
    a membrane electrode assembly;
    a bipolar separator plate; and
    flexible electrical contact members attached to said bipolar separator plate and pressed against but not permanently attached to said membrane electrode assembly.

14. The fuel cell assembly according to claim 13, wherein said flexible electrical contact members comprise a plurality of springs, whereby said springs maintain independently-acting compliant electrical contact between said membrane electrode assembly and said bipolar separator plate.

15. A fuel cell assembly, comprising:
    a bipolar separator plate, said bipolar separator plate having a first side and a second side;
    a membrane electrode assembly, attached to and sealed to said first side; and
    independently-acting compliant electrical contacts attached to said second side, for pressing against but not permanently attaching to a membrane electrode assembly of an adjacent fuel cell assembly.

16. A fuel cell stack, comprised of a first assembly according to claim 15 and a second assembly according to claim 15, wherein the independently-acting compliant electrical contacts of said first assembly are in electrical contact with the membrane electrode assembly of said second assembly.

17. A fuel cell assembly comprising:
    a membrane electrode assembly;
    a bipolar separator plate; and
    an independently-acting compliant electrical contact attached to said bipolar separator plate and pressed against but not permanently attached to said membrane electrode assembly.

18. A fuel cell assembly comprising:
    a membrane electrode assembly;
    a bipolar separator plate;
    first means for maintaining electrical contact attached to said bipolar separator plate and pressed against but not permanently attached to said membrane electrode assembly between said membrane electrode assembly and said bipolar separator plate; and
    second means for sealing said membrane electrode assembly with said bipolar separator plate, wherein said second means functions independently from said first means.

* * * * *